US007767103B2

(12) United States Patent
Bernard et al.

(10) Patent No.: US 7,767,103 B2
(45) Date of Patent: Aug. 3, 2010

(54) MICRO-FLUID EJECTION ASSEMBLIES

(75) Inventors: David L. Bernard, Lexington, KY (US); John W. Krawczyk, Richmond, KY (US); Christopher J. Money, Lexington, KY (US); Andrew L. McNees, Lexington, KY (US); Girish S. Patil, Lexington, KY (US); Karthik Vaideeswaran, Lexington, KY (US); Richard L. Warner, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1038 days.

(21) Appl. No.: 10/940,917

(22) Filed: Sep. 14, 2004

(65) Prior Publication Data

US 2006/0054591 A1 Mar. 16, 2006

(51) Int. Cl.
*G01D 15/00* (2006.01)
*B41J 2/05* (2006.01)

(52) U.S. Cl. .......................................... 216/27; 347/61

(58) Field of Classification Search ............. 347/61–64, 347/65; 216/27
See application file for complete search history.

(56) References Cited

U.S. PATENT DOCUMENTS

| | | | | |
|---|---|---|---|---|
| 5,091,339 | A | 2/1992 | Carey | |
| 5,173,442 | A | 12/1992 | Carey | |
| 5,658,471 | A * | 8/1997 | Murthy et al. | 216/27 |
| 6,402,301 | B1 | 6/2002 | Powers et al. | |
| 6,412,921 | B1 | 7/2002 | Manini | |
| 6,502,930 | B1 | 1/2003 | Shimada et al. | |
| 6,517,193 | B2 | 2/2003 | Kimura | |
| 6,533,399 | B2 | 3/2003 | Lee et al. | |
| 2002/0122100 | A1 * | 9/2002 | Nordstrom et al. | 347/65 |
| 2003/0080362 | A1 * | 5/2003 | Dodd et al. | 257/294 |
| 2003/0096465 | A1 | 5/2003 | Chen et al. | |
| 2004/0038541 | A1 | 2/2004 | Baier | |

OTHER PUBLICATIONS

Merriam-Webster online dictionary: laterally.*
Dielectric-Wikipedia, the free encyclopedia,p. 1 and paragraph 2.*
Insulator (Electrical)-Wikipedia, the free encyclopedia, p. 1 and paragraph 2, p. 5 and pragraphs 6-8.*

* cited by examiner

*Primary Examiner*—Matthew Luu
*Assistant Examiner*—Lisa M Solomon

(57) ABSTRACT

A micro-fluid ejection assembly and method therefor. The micro-fluid ejection assembly includes a silicon substrate having a fluid supply slot therein. The fluid supply slot is formed by an etch process conducted on a substrate using, a first etch mask circumscribing the fluid supply slot, and a second etch mask applied over a functional layer on the substrate.

13 Claims, 8 Drawing Sheets

FIG. 5
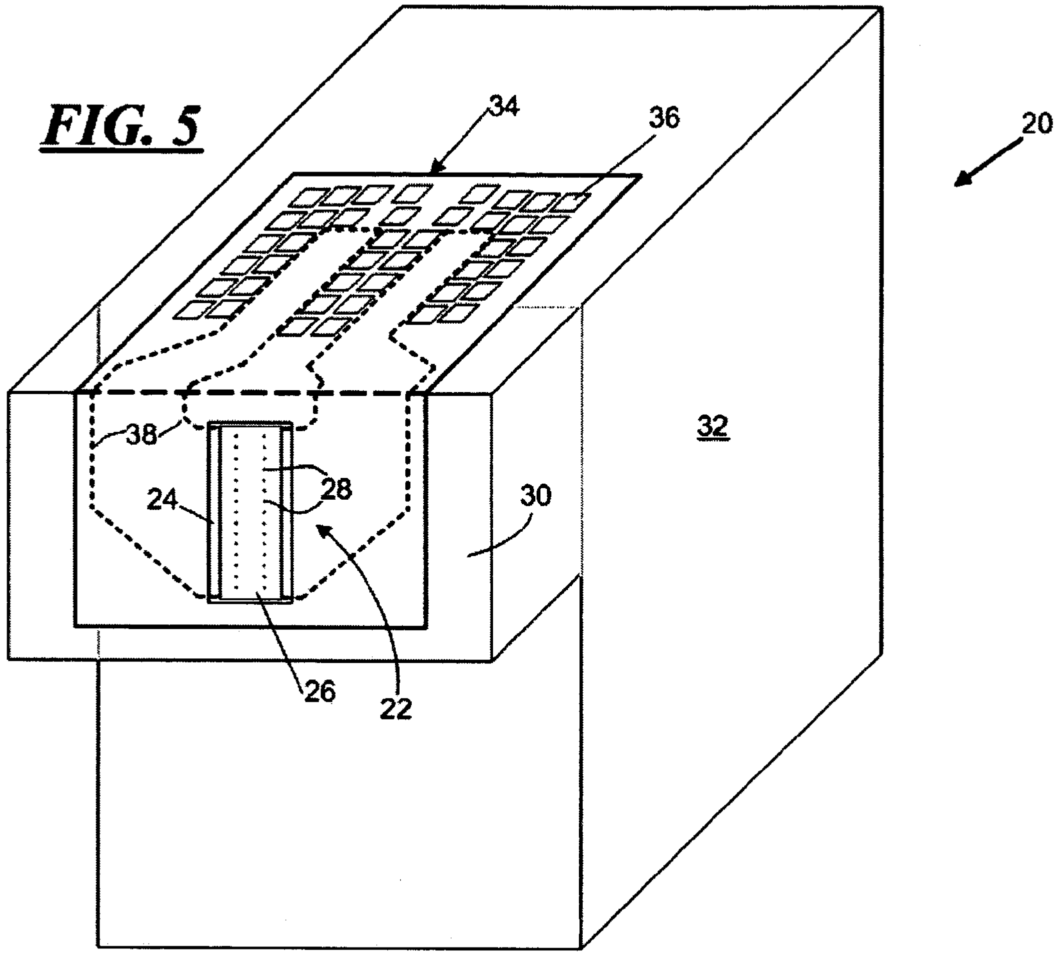
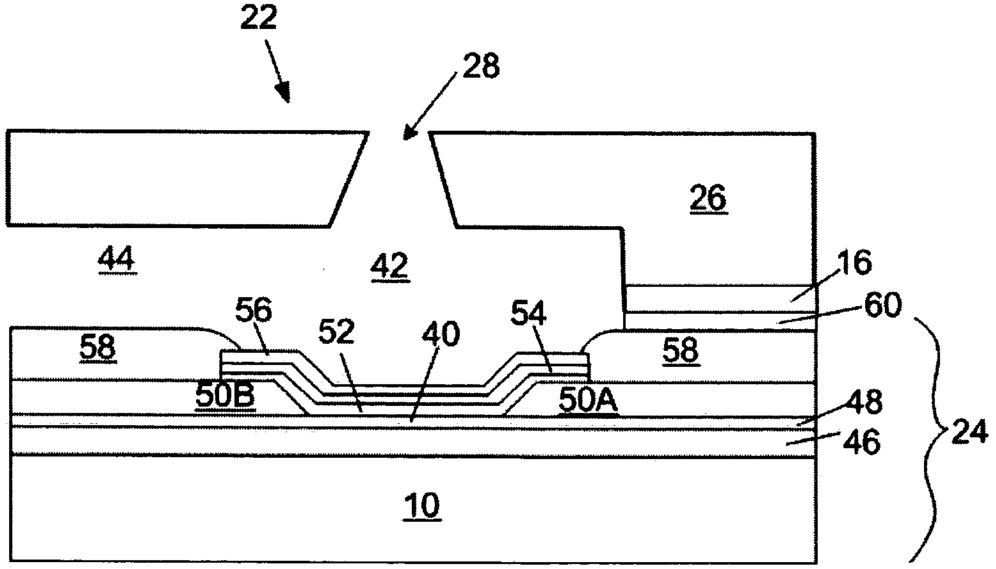
FIG. 6

MICRO-FLUID EJECTION ASSEMBLIES

FIELD OF THE INVENTION

The disclosure relates to micro-fluid ejection assemblies and, in particular, to ejection assemblies having accurately formed flow features etched therein.

BACKGROUND OF THE INVENTION

Micro-fluid ejection assemblies typically include a silicon substrate material that contains fluid openings, trenches, and/or depressions formed therein. The fluid openings, trenches, and/or depressions are collectively referred to herein as "flow features." Such flow features may be formed by a wide variety of micromachining techniques including sand blasting, wet chemical etching and reactive ion etching. As the devices become smaller, such as for ink jet printhead applications, micromachining of the substrates becomes a more critical operation. Not all micromachining techniques are reliable enough to produce accurately placed flow features having similar flow characteristics in the substrates. Accordingly, the micro-fluid ejection assembly art is constantly searching for improved micro-fluid ejection assemblies that can be produced in high yield at a minimum cost.

One method for micromachining silicon substrates is a dry etching process such as deep reactive ion etching (DRIE) or inductively coupled plasma etching. When dry etching a silicon substrate, parameters that are beneficial to one characteristic of the etched substrate are sometimes detrimental to another characteristic of the substrate.

For example, with reference to the prior art figures of FIGS. 1-3, silicon substrates 10 having fluid supply slots 12 therein require the fluid slots 12 to have a reentrant configuration for proper fluid flow as shown in FIG. 1. However, providing reentrant configurations for the fluid supply slots may cause top side silicon 10 damage 14 as shown in FIG. 2 and undercutting of a planarization layer 16 as shown in FIG. 3. Such top side silicon damage 14 may negatively affect shelf length control, which may lead to cross-talk, low chip strength and performance variability. Undercutting of the planarization layer 16 may lead to unwanted fluid intrusion between the silicon 10 and the planarization layer 16 on the silicon as shown in FIG. 3 which may cause the planarization layer 16 to delaminate from the substrate 10.

Accordingly, there remains a need for improved structures and methods of forming fluid supply slots in a semiconductor substrate using an improved wet or dry etch process.

SUMMARY OF THE INVENTION

With regard to the above, there is provided a micro-fluid ejection assembly including a silicon substrate having a fluid supply slot therein. The fluid supply slot is formed by an etch process conducted on a substrate using, a first etch mask circumscribing a fluid supply slot location, and a second etch mask applied over a functional layer on the substrate.

In another embodiment, there is provided a method of etching a silicon substrate to provide a fluid supply slot in the substrate. The method includes applying a first etch mask over a silicon substrate. At least one fluid supply slot location is defined in the first etch mask. A second etch mask is applied over at least some regions of the substrate other than the fluid supply slot location. At least one fluid supply slot is etched through a thickness of the substrate using an etch process. The second etch mask is removed from the substrate. According to the process, the first etch mask circumscribes the fluid supply slot location.

In yet another embodiment, there is provided a micro-fluid ejection head. The micro-fluid ejection head includes a semiconductor substrate containing a plurality of micro-fluid ejection devices thereon and at least one fluid supply slot therein. The fluid supply slot has at least one edge adjacent a top side protective material. A nozzle plate is attached to the semiconductor substrate to provide the micro-fluid ejection head.

An advantage of exemplary embodiments described herein is that an etched substrate may be produced by deep reactive ion etching to provide accurately produced parts which meet or exceed critical tolerances for the parts. The parts may include a wide variety of flow features including, but not limited to, etched fluid openings or etched recesses for fluids such as inks. In particular, exemplary embodiments of the invention can reduce or eliminate delamination of a protective layer on the substrate caused by fluids attacking an undercut area of the substrate adjacent the protective layer. Top side silicon damage adjacent the fluid feed slots in the substrate may also be reduced or eliminated.

BRIEF DESCRIPTION OF THE DRAWINGS

Further advantages will become apparent by reference to the detailed description of exemplary embodiments when considered in conjunction with the following drawings, in which like reference numbers denote like elements throughout the several views, and wherein:

FIG. 5 is a perspective view, not to scale, of a fluid cartridge for the fluid ejection device of FIG. 4;

FIG. 6 is a cross-sectional view, not to scale, of a portion of a micro-fluid ejection assembly;

DETAILED DESCRIPTION OF THE EXEMPLARY EMBODIMENTS

Figure 4:
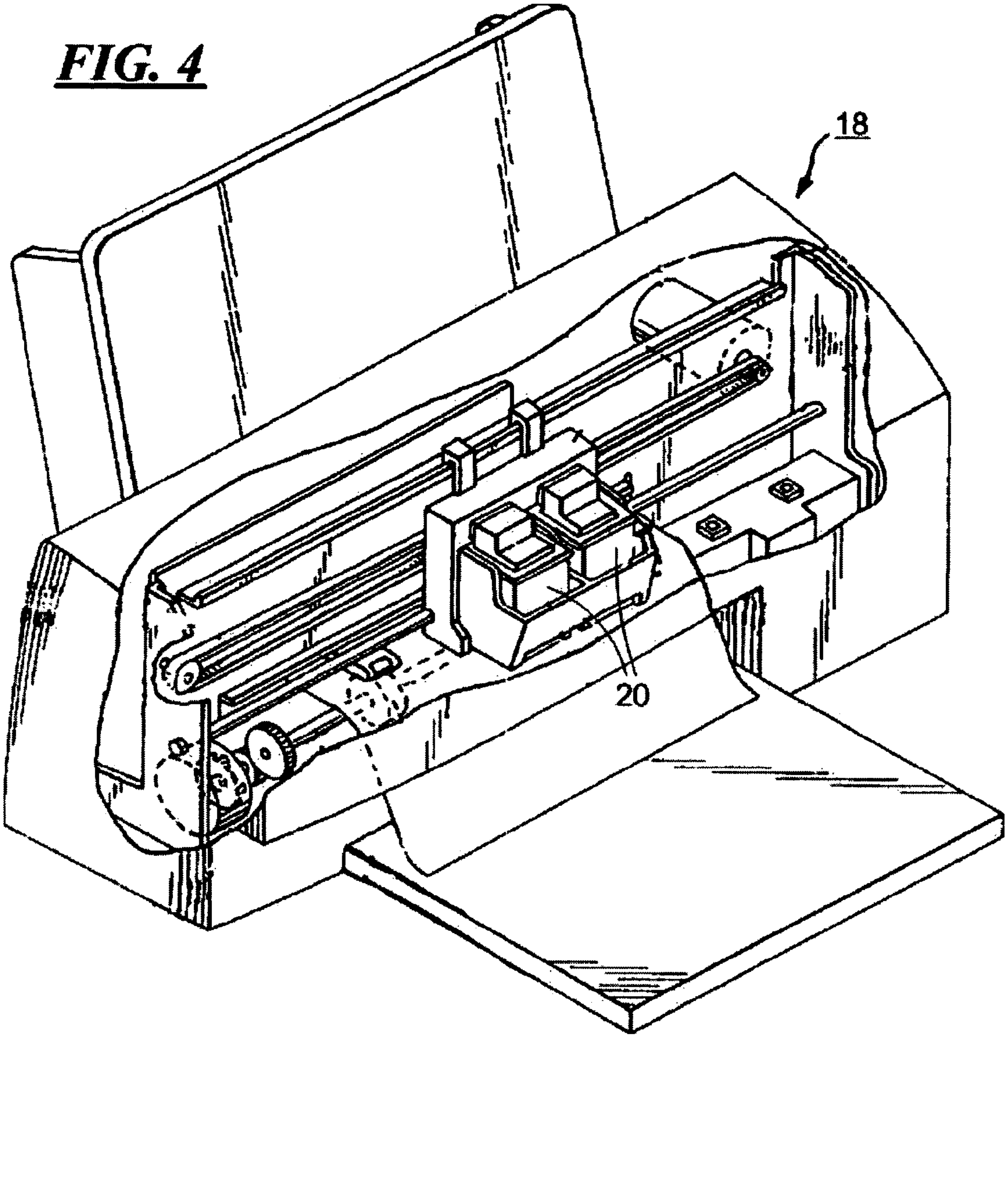
FIG. 4 is a perspective view, not to scale, of a fluid ejection device according to one embodiment of the disclosure.

Embodiments as described herein are particularly suitable for manufacture of semiconductor substrates for micro-fluid ejection assemblies used in fluid ejection devices. An exemplary fluid ejection device 18 is illustrated in FIG. 4. In one embodiment, the fluid ejection device 18 is an ink jet printer containing one or more ink jet printer cartridges 20.

An exemplary ink jet printer cartridge 20 is illustrated in FIG. 5. The cartridge 20 includes a printhead 22, also referred to herein as "a micro-fluid ejection assembly." As described in more detail below, the printhead 22 includes a heater chip 24 having a nozzle plate 26 containing nozzle holes 28 attached thereto.

The printhead 22 is attached to a printhead portion 30 of the cartridge 20. A main body 32 of the cartridge 20 includes a fluid reservoir for supply of a fluid such as ink to the printhead 22. A flexible circuit or tape automated bonding (TAB) circuit 34 containing electrical contacts 36 for connection to the printer 18 is attached to the main body 32 of the cartridge 20. Electrical tracing 38 from the electrical contacts 36 are attached to the heater chip 24 to provide activation of electrical devices on the heater chip 24 on demand from the printer 18 to which the cartridge 20 is attached. The invention however, is not limited to ink cartridges 20 as described above as the micro-fluid ejection assemblies 22 described herein may be used in a wide variety of fluid ejection devices, including but not limited to, ink jet printers, micro-fluid coolers, pharmaceutical delivery systems, and the like.

Figure 1:
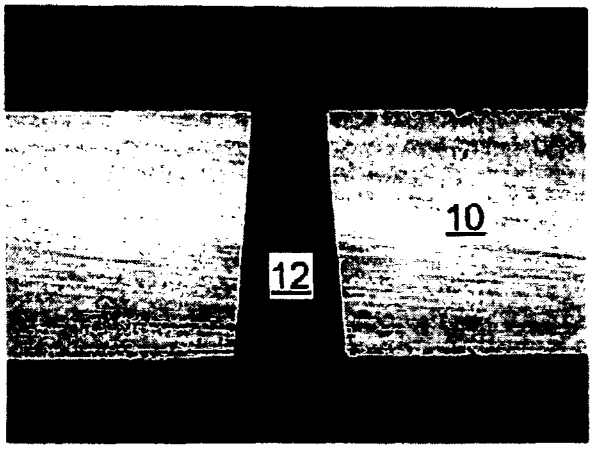
FIG. 1 Prior Art
FIG. 1 is a cross-sectional photomicrograph of a prior art fluid supply slot in a silicon substrate made by a conventional method.

A small, cross-sectional, simplified view of a micro-fluid ejection assembly 22 is illustrated in FIG. 6. The micro-fluid ejection assembly 22 includes a heater chip 24 containing a fluid ejection generator provided as by a heater resistor 40 and the nozzle plate 26 attached to the heater chip 24. The nozzle plate 26 contains the nozzle holes 28 and is preferably made from a fluid resistant polymer such as polyimide. Fluid is provided adjacent the heater resistor 40 in a fluid chamber 42 from a fluid supply channel 44 that connects through an opening or fluid supply slot 12 in the silicon substrate 10 (FIG. 1) with the fluid reservoir in the main body 32 of the cartridge 20 (FIG. 5).

In order to provide electrical impulses to the heater resistor 40, the heater chip 24 undergoes a number of thin film deposition and etching steps to define multiple functional layers on a semiconductor substrate such as silicon 10 (FIG. 6). Conventional microelectronic fabrication processes such as physical vapor deposition (PVD), chemical vapor deposition (CVD), or sputtering may be used to provide the various layers on the silicon substrate 10. As illustrated in FIG. 6, the chip 24 may include a substrate layer 10 of silicon, an insulating or first dielectric layer 46, a resistor layer 48, a first conductive layer 50, and one or more protective layers 52, 54, and 56. A second dielectric layer 58 is provided to insulate between the first conductive layer 50 and a second conductive layer 60. The first and second conductive layers 50 and 60 provide anode and cathode connections from a controller in the fluid ejection device 18 to the heater resistors 40.

The first dielectric layer 46 is preferably a field oxide layer of silicon dioxide having a thickness under the resistor layer 48 of about 10,000 Angstroms. However, the first dielectric layer 46 may also be provided by other materials, including, but not limited to, silicon carbides, silicon nitrides, phosphorus spin on glass, boron doped phosphorous spin on glass, and the like. The resistor layer 48 may be selected from a wide variety of metals or alloys having resistive properties. The first and second conductive layers 50 and 60 are typically metal conductive layers. The protective layers 52, 54, and 56 include passivation materials such as SiN and SiC and tantalum.

In order to attach the nozzle plate 26 to the heater chip 24, a smoothing or planarization layer 16 is optionally applied to the heater chip 24. The planarization layer 16 may be provided by spin coating a photoresist epoxy material on the heater chip 24. A useful photoresist epoxy material for the planarization layer 16 is described, for example, in U.S. Pat. Nos. 5,907,333 and 6,193,359, the disclosures of which are incorporated herein by reference. The planarization layer 16 typically has a thickness ranging from about 1 to about 10 microns and provides passivation or protection of the heater chip 24 from corrosion from fluids which may adversely affect functional layers on the heater chip 24 such as the conductive and resistive layers 50, 60, and 48.

Figure 7:
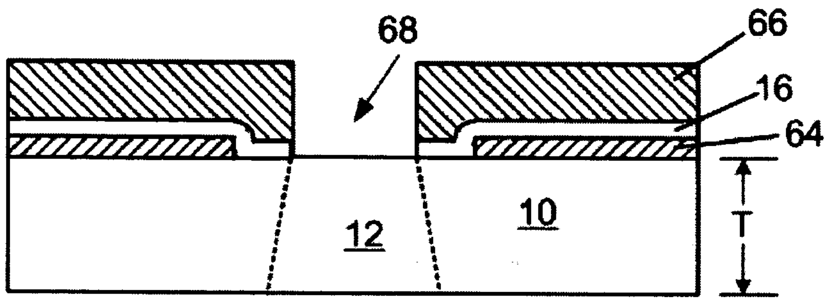
FIG. 7 Prior Art
FIGS. 7-8 are schematic drawings, not to scale, of a prior art process for dry etching a silicon substrate.
Figure 8:
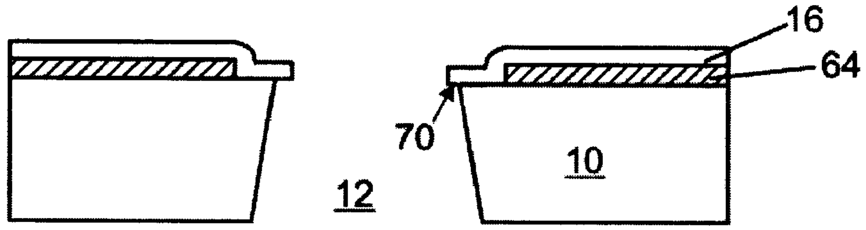
FIG. 8 Prior Art

For simplification purposes, the layers 46-60 on the substrate 10 are collectively referred to as functional layers 64. The functional layers 64 are protected by the planarization layer 16 as shown in FIGS. 7-8. During a conventional process for etching the fluid supply slot 12 through a thickness T of the silicon substrate 10, an etch mask 66 of an easily removable material is applied to the planarization layer 16 on a silicon wafer used for providing a plurality of silicon substrates 10. A supply slot location 68 is patterned and developed in the etch mask 66 to provide a location for dry etching the silicon substrate 10.

Figure 2:
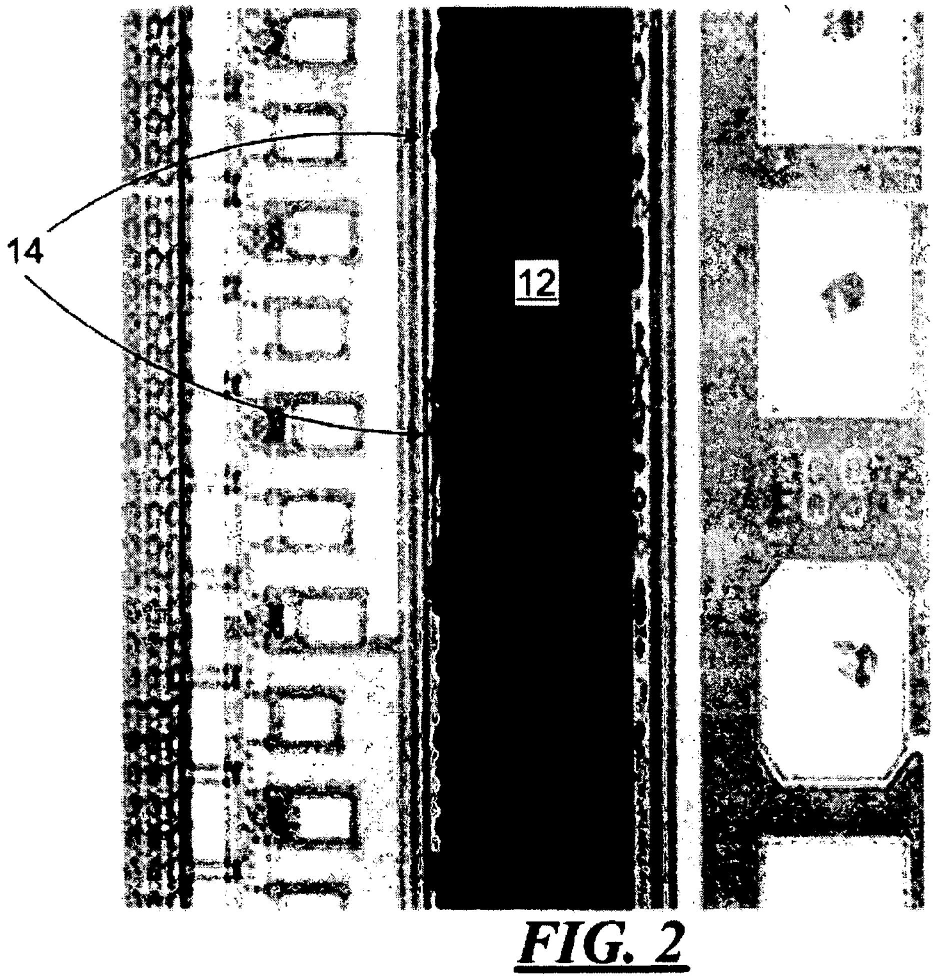
FIG. 2 Prior Art
FIG. 2 is a plan view photomicrograph of a prior art device side of a portion of a silicon substrate having a fluid supply slot therein made by a conventional method.
Figure 3:
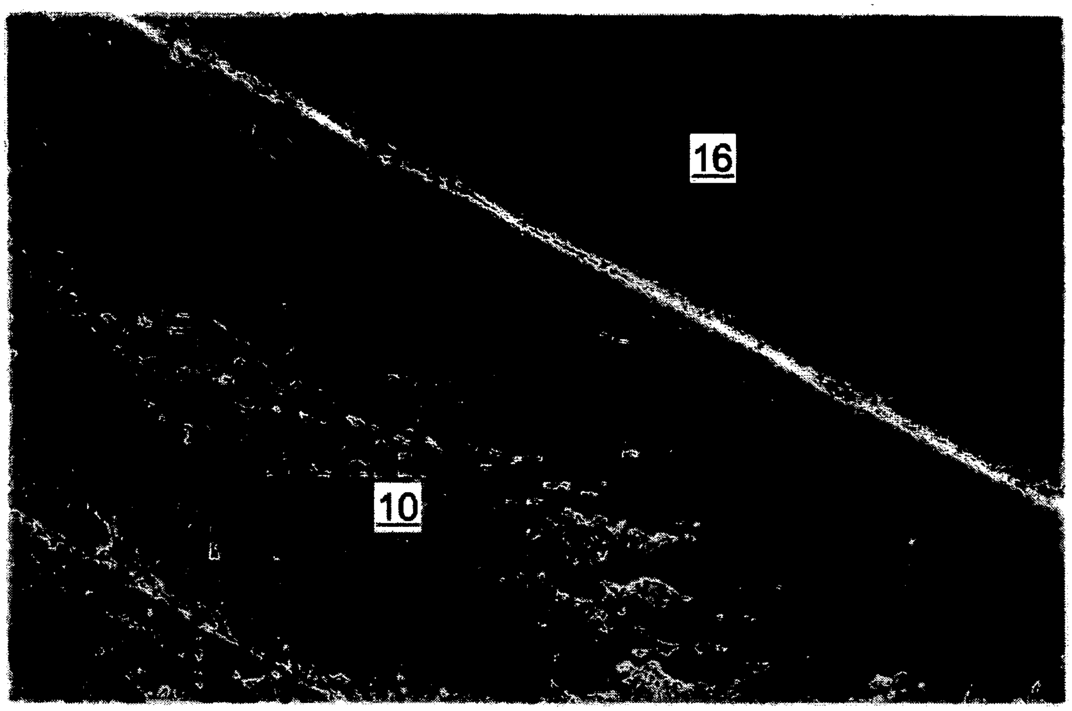
FIG. 3 Prior Art
FIG. 3 is a perspective photomicrograph of a portion of a prior art silicon substrate containing a protective layer thereon adjacent a fluid supply slot made by a conventional method.

The etch mask 66 should be substantially removable from the underlying planarization layer 16 without substantially affecting the planarization layer 16. Accordingly, one material for etch mask 66 is a soft mask material such as a positive or negative photoresist material. As described above, use of a conventional etch mask may result in top silicon damage 14 (FIG. 2) and/or undercutting of the planarization or protective layer 16 as shown in FIG. 3 and schematically in FIG. 8. Undercutting of the planarization layer 16 may provide a ledge 70 and lateral damage to the silicon adjacent to the ledge 70. Fluid may thus find a path between the planarization layer 16 and the silicon substrate 10 thereby leading to delamination of the planarization layer 16 from the substrate and subsequent corrosion of the functional layers 64.

The extent and severity of top silicon damage 14 and undercutting of the planarization layer 16 varies from wafer to wafer and from slot to slot 12. Usually top silicon damage 14 is area selective, tending to be most prominent at outer edges of a wafer with gradual reduction in magnitude toward a center of the wafer. Without desiring to be bound by theory, it is believed that a plasma sheath used in dry etching is non-uniform as a result of electromagnetic field line differences from the center to the edge of the wafer. Ion trajectories in the center of the wafer are more likely to be perpendicular to the wafer, where the sheath is typically more uniform, while ion trajectories near the edge of the wafer are typically angles. Accordingly, the foregoing damage 14 and ledge 70 are more pronounced on silicon substrates near the edge of the wafer.

Figure 9:
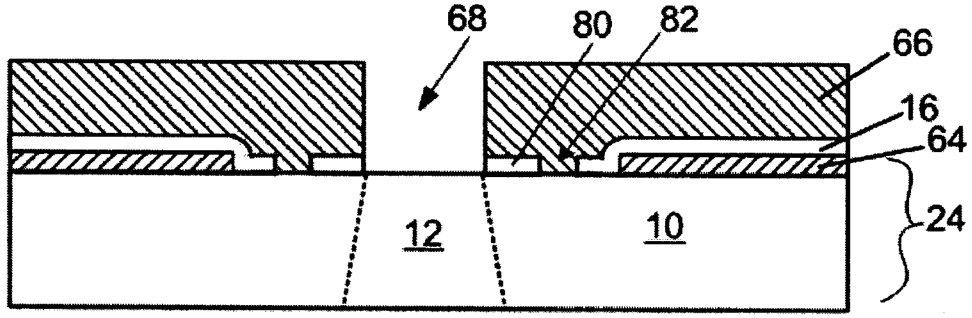
FIG. 9 is schematic drawings, not to scale, of a process for etching silicon substrates according to an embodiment of the disclosure.
Figure 10:
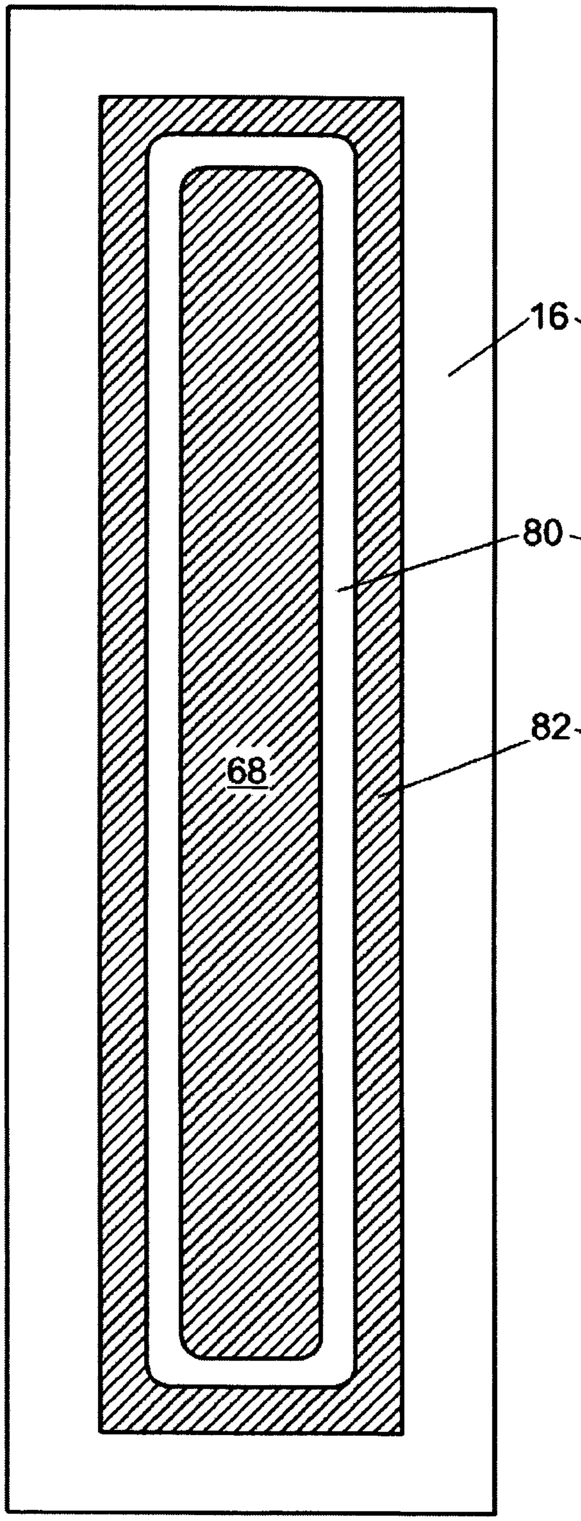
FIG. 10 is a plan view, not to scale, of a silicon substrate with an etch mask according to an embodiment of the disclosure.

In order to reduce or eliminate top silicon damage 14 and delamination of the planarization layer 16 from the functional layers 64 and silicon substrate 10, a plurality of etch masks can be used. In a first embodiment, as shown in FIG. 9, a first etch mask 80 is applied over (e.g., to a surface of) the silicon substrate 10. The first etch mask 80 is adjacent to and substantially circumscribes a location 68 for the fluid supply slot 12 as shown in plan view in FIG. 10. The first etch mask 80 may be made from a variety of materials that are suitably used as an etch mask for dry etching a substrate 10, such as a photoresist epoxy material as described above with respect to the planarization layer 16. Accordingly, the first etch mask 80 may be applied as the planarization layer 16 wherein a decoupling groove 82 is patterned and developed in the planarization layer 16 to provide the first etch mask 80 and planarization layer 16 (FIGS. 9 and 10). The thickness of the first etch mask 80 is substantially the same as the thickness of the planarization layer 16, described above.

Figure 11:
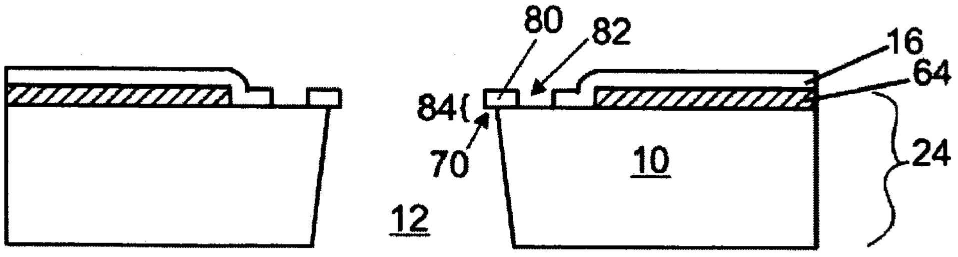
FIG. 11 is a schematic drawing, not to scale, of a heater chip made according to an embodiment of the disclosure.
Figure 12:
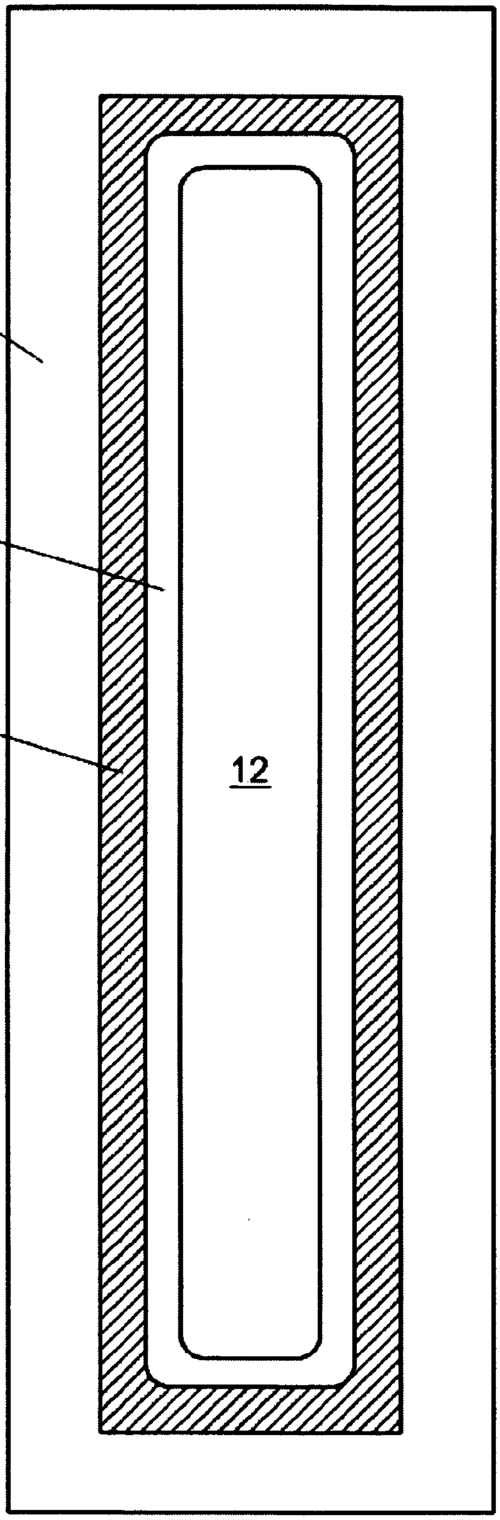
FIG. 12 is a plan view, not to scale, of a heater chip etched according to an embodiment of the disclosure.

Next, a second etch mask 66 is applied over (e.g., to a surface of) the planarization layer 16, the first etch mask 80, and into groove 82 thereby protecting the first etch mask 80, groove 82, and planarization layer 16, if present, during the dry etching process. The second etch mask 66 may be provided by a soft mask material as described above with reference to FIGS. 7 and 8. As will be appreciated from FIGS. 11 and 12, the first etch mask 80 and groove 82 provides an impediment to delamination of the planarization layer 16. Accordingly, even if a ledge 70 is formed and there is lateral damage of the silicon adjacent the ledge 70 as shown in FIG. 3, corrosive fluid may have little or no effect on the planarization layer 16. In this case, the planarization layer 16 is decoupled from the first etch mask 80 and does not extend to a top side 84 of the silicon substrate 10 adjacent the fluid supply slot 12. Ideally, substantially all of the first etch mask 80 will be removed during the etching process. However, such removal is not necessary as a small portion of the etch mask 80 may remain substantially circumscribing the fluid supply slot 12 as shown in FIG. 12. Hence, the foregoing embodiment may substantially reduce delamination effects caused by corrosive fluids finding a path between the planarization layer 16 and the silicon substrate 10.

Once the slot 12 is formed through the thickness of the substrate 10, the second etch mask 66 is removed from the heater chip 24 by conventional mask removal methods such as dissolving, etching, ashing, and the like. Since the planarization layer 16 does not extend to the top side 84 of the substrate adjacent the fluid supply slot 12, even if there is minor undercutting of the first mask 80, it is less likely that fluid will reach the planarization layer 16 and cause delamination of the layer 16 from the substrate 10.

In other embodiments, a hard etch mask 86 and a soft etch mask 66 are applied over the heater chip 24, and planarization layer 16, respectively. In a second embodiment, the soft etch mask 66 is applied over a hard etch mask 86 as well as over the planarization layer 16. As with the first etch mask 80, the hard etch mask 86 is adjacent to and substantially circumscribes the fluid supply slot location 68. During a dry etch process both the hard mask 86 and soft mask 66 recede from the fluid supply slot 12. However, as before, a portion of the hard mask 86 may remain on the substrate 10 circumscribing the fluid supply slot 12.

Suitable materials for the hard etch mask 86 include, but are not limited to, silicon dioxide, silicon carbide, silicon nitride, and silicon oxynitride. Of the foregoing, silicon dioxide is particularly preferred as the hard mask 86. A silicon oxide hard mask 86 may be provided on a surface of the substrate 10 as by growing a silicon oxide layer by exposing the substrate 10 to the atmosphere for a period of time. The thickness of the hard mask 86 may range from about 0.5 to about 5 microns. For purposes of the disclosure, references to “silicon oxide” are intended to include, silicon mono-oxide, silicon dioxide and $SiO_x$ wherein x ranges from about 1 to about 4.

A benefit of using a hard mask 86, for example silicon dioxide, is that silicon dioxide dry etches at a much slower rate than silicon. In general, silicon etches in a DRIE chamber at a rate that is about 150 to about 200 times faster than the dry etch rate of silicon dioxide. Accordingly, the hard mask 86 resists lateral etching of the substrate 10 at a top side 84 of the substrate adjacent the fluid supply slot 12 thereby reducing top side damage 14.

A disadvantage of using a hard mask 86, such as silicon dioxide, without also using the soft mask 66, is that the hard mask 86 is much more difficult to remove from the heater chip 24 and planarization layer 16 than the soft mask 66. However, the hard mask 86 recedes from the top side 84 adjacent the fluid supply slot 12 more slowly than does the soft mask 66, thereby reducing exposure of the top side 84 to reactive ion etching. Accordingly, judicious use of the hard mask 86 circumscribing a region adjacent fluid feed slot location 68 in combination with the soft mask 66 applied over regions of the substrate excluding the fluid supply slot location 68 may significantly reduce the top side damage 14 and undercutting of the planarization layer 16 described above.

Once etching of the substrate 10 is complete, any remaining soft mask 66 may be removed from the hard mask 86 and planarization layer 16 as described above. Since the planarization layer 16 does not extend to the side 84 the substrate adjacent the fluid supply slot 12, even if there is minor undercutting of the hard mask 86, it is less likely that fluid will reach the planarization layer 16 and cause delamination of the layer 16 from the substrate 10.

Figure 13:
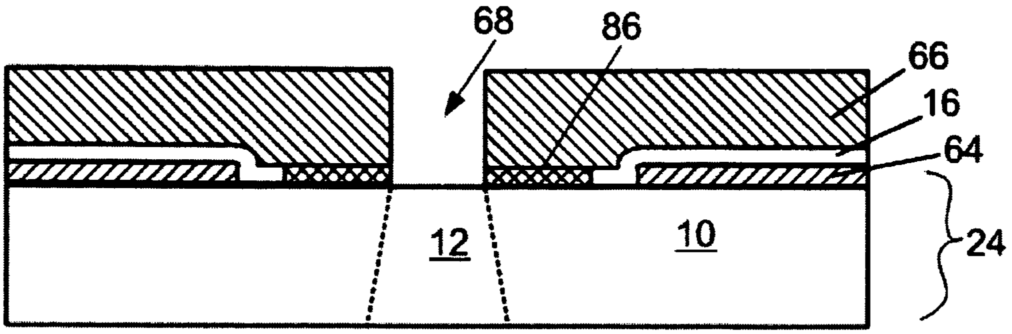
FIGS. 13-14 are schematic drawings, not to scale, of a process for etching and an etched heater chip made according to another embodiment of the disclosure.
Figure 14:
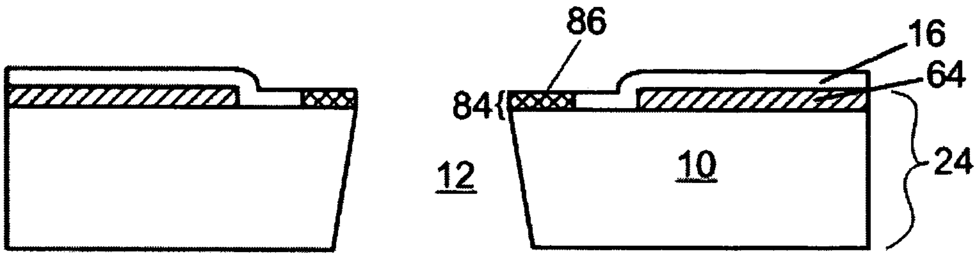
Figure 15:
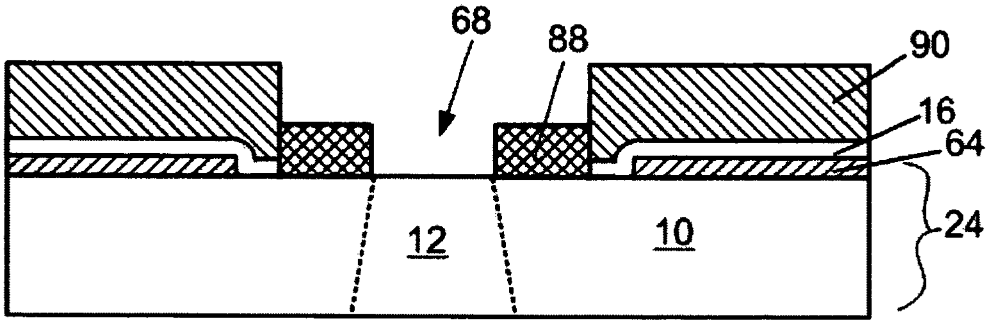
FIGS. 15-16 are schematic drawings, not to scale, of a process for etching and an etched heater chip made according to still another embodiment of the disclosure.
Figure 16:
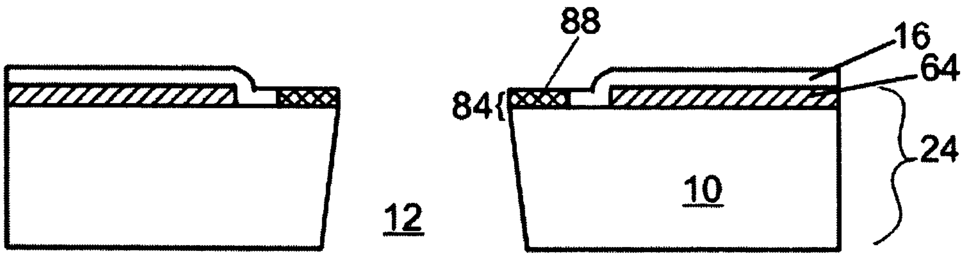

In third embodiment, a different combination of hard mask 88 and soft mask 90 are illustrated in FIGS. 15 and 16. In this embodiment, the hard mask 88 is substantially thicker than the hard mask 86 in FIGS. 13 and 14. Accordingly, the hard mask 86 may have a thickness ranging from about 3 to about 10 microns. As before, the hard mask 88 is adjacent to a fluid supply slot location 68 and substantially circumscribes the fluid supply slot location 68. However, in this embodiment, the soft mask 90 is only applied to protect the planarization 16 layer during the etch process and is not applied over the hard mask 88. The increased thickness of the hard mask provides sufficient etch resistance to protect the top side 84 of the silicon substrate 10 adjacent the fluid supply slot 12 and as before reduces or eliminates lateral damage of the substrate top side 84 during the reaction ion etching process.

Once the slot 12 is formed through the thickness of the substrate 10, the soft mask 90 is removed as described above. As in the previous embodiment, a portion of the hard mask 88 may remain adjacent the fluid supply slot 12 as shown in FIG. 16. Also as described above, since the planarization layer 16 terminates before the top side 84 of the substrate, even if there is minor undercutting of the hard mask 88, it is less likely that fluid will reach the planarization layer 16 and cause delamination of the layer 16 from the substrate 10.

Figure 17:
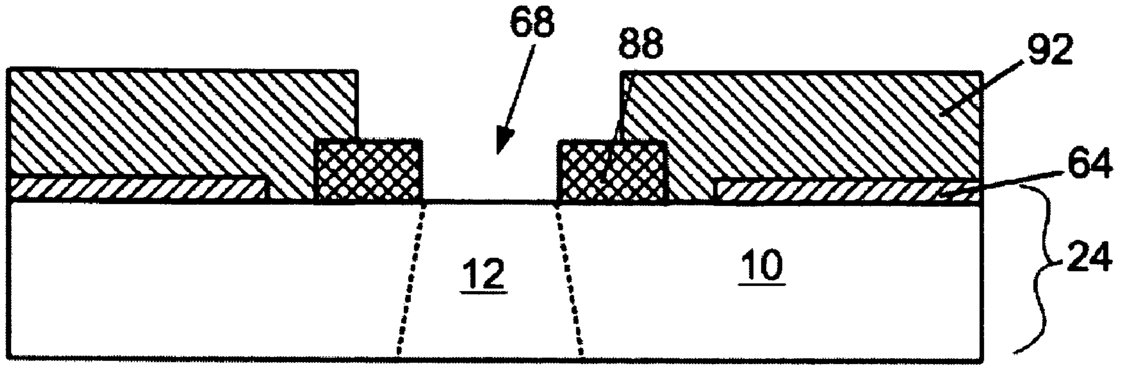
FIGS. 17-18 are schematic drawings, not to scale, of a process for etching and an etched heater chip made according to yet another embodiment of the disclosure.
Figure 18:
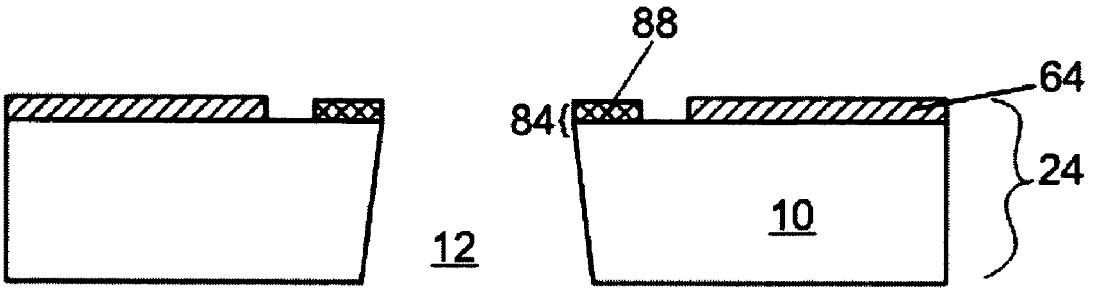

In yet another embodiment, illustrated in FIGS. 17 and 18, a planarization layer 16 is applied in a process after forming the fluid supply slots 12 in the substrate 10. Accordingly, the hard mask 88 is applied as described above in the third embodiment to the substrate 10 and a soft mask layer 92 is applied over exposed regions of the substrate 12 and functional layers 64 excluding the fluid supply slot location 68. As shown in FIG. 17, the soft mask layer 92 may optionally cover at least a portion of the hard mask 88. Once the slot 12 is formed through the thickness of the substrate 10, the soft mask 92 is removed as described above. As in the previous embodiment, a portion of the hard mask 88 may remain adjacent the fluid supply slot 12 as shown in FIG. 18. The hard mask 88 thus provides protection of the top side 84 of the substrate and eliminates or reduces top side damage 14.

While specific embodiments of the disclosure have been described with particularity herein, it will be appreciated that modification and additions by those skilled in the art may be applied to the disclosed embodiments within the spirit and scope of the appended claims.

What is claimed is:

1. A micro-fluid ejection assembly, comprising a silicon substrate having a functional layer on a top side of the substrate, a fluid supply slot therein, at least a portion of a first etch mask on the top side of the substrate circumscribing a top edge of the fluid supply slot, and a planarization layer applied to the functional layer and top side of the substrate, wherein the planarization layer is remote from the top edge of the slot and the at least a portion of the first etch mask is laterally disposed relative to the planarization layer between the top edge of the slot and the planarization layer.

2. The micro-fluid ejection assembly of claim 1, wherein the at least a portion of the first etch mask consists essentially of a polymeric layer spaced-apart from the planarization layer by a groove.

3. The micro-fluid ejection assembly of claim 2, wherein the polymeric layer comprises a photoresist epoxy material.

4. The micro-fluid ejection assembly of claim 1, wherein the at least a portion of the first etch mask comprises a hard mask selected from the group consisting of silicon dioxide, silicon carbide, silicon nitride, and silicon oxynitride.

5. The micro-fluid ejection assembly of claim 1, wherein the at least a portion of the first etch mask has an initial thickness ranging from about 0.5 to about 10 microns.

6. An ink jet printer containing the micro-fluid ejection assembly of claim 1.

7. A micro-fluid ejection head comprising:

a substrate containing a plurality of micro-fluid ejection devices on a top side of the substrate and at least one fluid supply slot therein, wherein the fluid supply slot has at least one top edge adjacent a top side protective material;

a planarization layer attached to the top side of the substrate in an area that is remote from the top edge of the slot so that the top side protective material is laterally offset from the planarization layer between the planarization layer and the top edge of the slot; and a nozzle plate attached to the substrate.

8. The micro-fluid ejection head of claim 7, wherein the top side protective material comprises a first etch mask spaced apart from the planarization layer.

9. The micro-fluid ejection head of claim 8, wherein the first etch mask consists essentially of a polymeric layer.

10. The micro-fluid ejection head of claim 9, wherein the polymeric layer comprises a photoresist epoxy material.

11. The micro-fluid ejection head of claim 7, wherein the top side protective material comprises a hard mask material selected from the group consisting of silicon dioxide, silicon carbide, silicon nitride, and silicon oxynitride.

12. The micro-fluid ejection head of claim 11, wherein the hard mask material has an initial thickness ranging from about 0.5 to about 10 microns.

13. The micro-fluid ejection head of claim 7, wherein the top side protective material circumscribes the top edge of the at least one fluid supply slot.

* * * * *